(12) United States Patent
Mizunuma et al.

(10) Patent No.: US 6,453,372 B1
(45) Date of Patent: Sep. 17, 2002

(54) DATA COMMUNICATION SYSTEM FOR AND METHOD OF AVOIDING COMPUTER NETWORK TRANSMISSIONS OF EXCESSIVE LENGTH

(75) Inventors: Ichiro Mizunuma; Satoshi Horiike, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/250,708

(22) Filed: Feb. 16, 1999

(30) Foreign Application Priority Data

May 1, 1998 (JP) .......................... 10-122576

(51) Int. Cl.[7] .......................... G06F 13/14; G06F 13/20
(52) U.S. Cl. .......................... 710/52; 710/57; 709/213; 709/232; 709/236
(58) Field of Search .......................... 710/52, 57; 709/213, 709/232, 236

(56) References Cited

U.S. PATENT DOCUMENTS 5,291,486 A * 3/1994 Koyanagi .................... 370/84
5,615,213 A * 3/1997 Griefer ........................ 370/412
5,920,703 A * 7/1999 Campbell et al. ...... 395/200.66
5,920,732 A * 7/1999 Riddle ......................... 395/876

FOREIGN PATENT DOCUMENTS

| JP | 60-160745 | | 8/1985 |
| JP | 05227194 A | * | 9/1993 |
| JP | 8-180006 | | 7/1996 |
| JP | 9-247198 | | 9/1997 |

* cited by examiner

*Primary Examiner*—Jeffrey Gaffin
*Assistant Examiner*—Rehana Perveen
(74) *Attorney, Agent, or Firm*—Leydig, Voit & Mayer, Ltd.

(57) ABSTRACT

A data communication system includes in middleware a transmission task that transmits a message to a receiving host computer through a network, considering the transmission capability of the transmitting host computer and the receiving capability of the receiving host computer. This solves the problem in a conventional data communication system in which, if a host computer loses a token after acquiring it, operator stations and the like connected to a network are unable to send a message.

16 Claims, 9 Drawing Sheets

FIG.2

(ALGORITHM OF TRANSMISSION TASK)

(TEMPORARY VARIABLES)
  l_send : TOTAL NUMBER OF BYTES TRANSMITTED IN A CYCLE.
  p_sent : TOTAL NUMBER OF PACKETS TRANSMITTED IN A CYCLE.
  l_[h]recv : TOTAL NUMBER OF BYTES TRANSMITTED TO A HOST h IN A CYCLE.
  p_[h]recv : TOTAL NUMBER OF PACKETS TRANSMITTED TO A HOST h IN A CYCLE.

(LITERAL)
  L_packet, min : MINIMUM PACKET LENGTH.

(THE TRANSMISSION TASK IS ACTIVATED EVERY T_tick CYCLE TO EXECUTE THE FOLLOWING PROCESSING)

ST1 : CLEAR l_send AND p_send TO ZERO. CLEAR l_[h]recv AND p_[h]recv TO ZERO FOR ALL HOSTS h.
ST2 : EXECUTE THE FOLLOWING PROCESSINGS FOR THE ENTIRE CHANNELS i.
  ST3 : PROCEED TO THE NEXT CHANNEL IF THE CHANNEL i IS "RECEIVE".
  ST4 : PROCEED TO THE NEXT CHANNEL AFTER SETTING THE FLAG OF THE CHANNEL i TO "TRANSMIT", IF THE TRANSMISSION TIME OF THE CHANNEL i ARRIVES.
ST10 : EXECUTE THE FOLLOWING PROCESSINGS FOR THE ENTIRE CHANNEL i IN PREDETERMINED ORDER ( FOR EXAMPLE, IN INCREASING ORDER OF PERIODS OF THE CYCLES).
  ST11 : PROCEED TO THE NEXT CHANNEL IF THE CHANNEL i IS "RECEIVE".
  ST12 : PROCEED TO THE NEXT CHANNEL IF THE FLAG OF THE CHANNEL i IS NOT "TRANSMIT".
  ST13 : PROCEED TO THE NEXT CHANNEL IF NO UNTRANSMITTED PACKET IS PLACED IN THE TRANSMISSION QUEUE OF THE CHANNEL i.
  ST14 : PROCEED TO THE NEXT CHANNEL IF THE SUM OF THE l_send AND THE BYTE NUMBER OF THE PACKET EXCEEDS L_send.
  ST15 : PROCEED TO THE NEXT CHANNEL IF THE SUM OF THE l_[h]recv AND THE BYTE NUMBER OF THE PACKET EXCEEDS L_[h]recv, WHERE h DENOTES A FAR END OF THE CHANNEL i.
  ST16 : PROCEED TO THE NEXT CHANNEL IF THE p_[h]recv PLUS ONE EXCEEDS P_[h]recv.
  ST17 : TRANSMIT THE PRESENT PACKET.
  ST18 : ADD THE BYTE NUMBER OF THE PACKET TO l_send AND l_[h]recv, RESPECTIVELY. ADD ONE TO p_send AND p_[h]recv, RESPECTIVELY.
  ST19 : IF THE PRESENT PACKET IS THE FINAL PACKET OF A MESSAGE, SET THE FLAG OF THE CHANNEL i TO "IDLE", AND DISCARD THE MESSAGE. IF THERE ARE ANY BLOCKED APPLICATION PROGRAMS WHICH ARE CALLED BY THE FUNCTION_send ( ) AND ASSOCIATED WITH THE CHANNEL i, RELEASE THE BLOCK OF ONE OF THEM.
  ST20 : IF p_send REACHES P_send, OR IF THE DIFFERENCE OBTAINED BY SUBTRACTING l_send FROM L_send IS LESS THAN L_packet, min, GO TO STEP ST30.
  ST21 : PROCEED TO THE NEXT CHANNEL.
ST30 : END.

FIG.3

(ALGORITHM OF RECEPTION TASK)

ST31 : AWAIT PACKET ARRIVAL FROM THE NETWORK. MAKE THE IDENTIFIER OF AN INCOMING CHANNEL "i".
ST32 : IF THERE IS A PACKET THAT HAS ALREADY HELD IN THE TEMPORARY BUFFER OF THE CHANNEL i, THEN GO TO STEP ST35.
ST33 : IF THE PACKET NUMBER OF A RECEIVED PACKET IS NOT ZERO, THEN GO BACK TO STEP ST31 AFTER DISCARDING THE PACKET.
ST34 : STORE THE RECEIVED PACKET INTO THE TEMPORARY BUFFER AND GO TO STEP ST38.
ST35 : IF THE MESSAGE NUMBER OF THE RECEIVED PACKET DISAGREES WITH THAT OF THE PACKET IN THE TEMPORARY BUFFER, THEN GO BACK TO STEP ST31 AFTER DISCARDING THE RECEIVED PACKET AND THE PACKETS IN THE TEMPORARY BUFFER.
ST36 : IF THE PACKET NUMBER OF THE RECEIVED PACKET DIFFERS FROM A VALUE OBTAINED BY ADDING ONE TO THE PACKET NUMBER OF THE LATEST PACKET IN THE TEMPORARY BUFFER, THEN GO BACK TO STEP ST31 AFTER DISCARDING THE RECEIVED PACKET AND THE PACKETS IN THE TEMPORARY BUFFER.
ST37 : STORE THE RECEIVED PACKET INTO THE TEMPORARY BUFFER AND GO TO STEP ST38.
ST38 : IF THE RECEIVED PACKET IS NOT THE FINAL PACKET OF THE MESSAGE, GO BACK TO STEP ST31.
ST39 : ASSEMBLE THE PACKETS IN THE TEMPORARY BUFFER INTO THE MESSAGE.
ST40 : PLACE THE MESSAGE INTO THE RECEPTION QUEUE OF THE CHANNEL i. IF THE RECEPTION QUEUE IS FULL, DISCARD THE OLDEST (OR LATEST ) MESSAGE. IF THERE ARE ANY BLOCKED APPLICATION PROGRAMS WHICH ARE CALLED BY THE FUNCTION_recv ( ) AND ASSOCIATED WITH THE CHANNEL i, THEN RELEASE ONE OF THEM.
ST41 : GO TO STEP ST31.

FIG.4

( TRANSMISSION RECEPTION CAPABILITY TABLE )  17a

| SYMBOLS | DESCRIPTION |
|---|---|
| $T\_tick$ | CYCLE OF THE TRANSMISSION TASK |
| $L\_recv$ | MAXIMUM NUMBER OF RECEIVABLE BYTES PER $T\_tick$ OF THE PRESENT HOST |
| $P\_recv$ | MAXIMUM NUMBER OF RECEIVABLE PACKETS PER $T\_tick$ OF THE PRESENT HOST |
| $L\_send$ | MAXIMUM NUMBER OF TRANSMITTABLE BYTES PER $T\_tick$ OF THE PRESENT HOST |
| $P\_send$ | MAXIMUM NUMBER OF TRANSMITTABLE PACKETS PER $T\_tick$ OF THE PRESENT HOST |
| $L\_[h]recv$ | MAXIMUM NUMBER OF RECEIVABLE BYTES OF AN EXTERNAL HOST h, WHICH IS ASSIGNED TO THE PRESENT HOST BY THE EXTERNAL HOST h |
| $P\_[h]recv$ | MAXIMUM NUMBER OF RECEIVABLE PACKETS OF AN EXTERNAL HOST h, WHICH IS ASSIGNED TO THE PRESENT HOST BY THE EXTERNAL HOST h |

FIG. 5

(HOST MANAGEMENT TABLE)       17b

| HOST IDENTIFIER h | IP ADDRESS |
|---|---|
| 0 | |
| 1 | |
| ⋮ | |
| H-1 | |

FIG. 7

(LIBRARY FUNCTION)
  FUNCTION_send
    struct sbuf_t {
        int ch_id_at_sender;
        int ch_id_at_recver;
        u_long addr_sender;
        u_long addr_recver;
        int msg_seq_num;
        int packet_id;
        int size;
        void data;
    };

int_send(
        int ch_id,
        struct sbuf_t *sbuf,
        int flags)

FUNCTION_recv
    int_recv(
        int ch_id,
        char *buf,
        int limit_size,
        int *size,
        int flags)

FIG.6

(CHANNEL MANAGEMENT TABLE) 17c

| CHANNEL IDENTIFIER i | CYCLE T[i] | MESSAGE LENGTH M[i] | DIRECTION (TRANSMIT /RECEIVE) | DESTINATION HOST IDENTIFIER | FLAG (IDLE/ TRANSMIT/ ACKNOWLEDGE-RETRANSMIT) | TRANS-MITTED seq # | ACKOWL-EDGED seq # |
|---|---|---|---|---|---|---|---|
| 0 | | | | | | | |
| 1 | | | | | | | |
| --- | | | | | | | |
| N-1 | | | | | | | |

FIG.9

(ALGORITHM OF TRANSMISSION TASK DURING ACKNOWLEDGE-RETRANSMISSION)

(TEMPORARY VARIABLES, AND LITERAL CONSTANTS) SAME AS THOSE OF FIG.2.

(THE TRANSMISSION TASK IS ACTIVATED EVERY T_tick CYCLE TO EXECUTE THE FOLLOWING PROCESSING)

ST1 : CLEAR l_send AND p_send TO ZERO. CLEAR l_[h]recv AND p_[h]recv TO ZERO FOR ALL h.
ST2 : EXECUTE THE FOLLOWING PROCESSINGS FOR THE ENTIRE CHANNELS i.
  ST3 : PROCEED TO THE NEXT CHANNEL IF THE CHANNEL i IS "RECEIVE".
  ST4 : PROCEED TO THE NEXT CHANNEL AFTER SETTING THE FLAG OF THE CHANNEL i TO "TRANSMIT", IF THE TRANSMISSION TIME OF THE CHANNEL i ARRIVES.
  ST51 : SET THE FLAG OF THE CHANNEL i TO "ACKNOWLEDGE-RETRANSMIT", AND PROCEED TO THE NEXT CHANNEL, IF THE ACKNOWLEDGE-RETRANSMIT IS DESIGNATED FOR THE CHANNEL i, AND THE ACKNOWLEDGE-RETRANSMIT TIME OF THE CHANNEL i COMES.
ST10 : EXECUTE THE FOLLOWING PROCESSINGS FOR THE ENTIRE CHANNEL i IN PREDETERMINED ORDER (FOR EXAMPLE, IN INCREASING ORDER OF PERIODS OF THE CYCLES).
  ST11 : PROCEED TO THE NEXT CHANNEL IF THE CHANNEL i IS "RECEPTION".
  ST52 : PROCEED TO THE NEXT CHANNEL IF THE FLAG OF THE CHANNEL i IS NEITHER "TRANSMIT" OR "ACKNOWLEDGE-RETRANSMIT".
  ST53 : GO TO STEP ST54 IF THE FLAG IS "ACKNOWLEDGE-RETRANSMIT".
  ST13 : PROCEED TO THE NEXT CHANNEL IF NO UNTRANSMITTED PACKET IS PRESENT IN THE TRANSMISSION QUEUE OF THE CHANNEL i.
  ST14 : PROCEED TO THE NEXT CHANNEL IF THE SUM OF THE l_send AND THE BYTE NUMBER OF THE PACKET EXCEEDS L_send.
  ST15 : PROCEED TO THE NEXT CHANNEL IF THE SUM OF THE l_[h]recv AND THE BYTE NUMBER OF THE PACKET EXCEEDS L_[h]recv, WHERE h DENOTES A FAR END OF THE CHANNEL i.
  ST16 : PROCEED TO THE NEXT CHANNEL IF THE p_[h]recv PLUS ONE EXCEEDS P_[h]recv.
  ST17 : TRANSMIT THE PRESENT PACKET.
  ST18 : ADD THE BYTE NUMBER OF THE PACKET TO l_send AND l_[h]recv, RESPECTIVELY. ADD ONE TO p_send AND p_[h]recv, RESPECTIVELY.
  ST19 : IF THE PRESENT PACKET IS THE FINAL PACKET OF A MESSAGE, SET THE FLAG OF THE CHANNEL i TO "IDLE", AND DISCARD THE MESSAGE. IF THERE ARE ANY BLOCKED APPLICATION PROGRAMS WHICH ARE CALLED BY THE FUNCTION_send ( ) AND ASSOCIATED WITH THE CHANNEL i, RELEASE THE BLOCK OF ONE OF THEM.
  ST20 : IF p_send REACHES P_send, OR IF THE DIFFERENCE OBTAINED BY SUBTRACTING l_send FROM L_send IS LESS THAN L_packet, min, GO TO STEP ST30.
  ST21 : PROCEED TO THE NEXT CHANNEL.
  ST54 : GO TO STEP ST58 WHEN RETRANSMISSION HAS ALREADY STARTED.
  ST55 : PROCEED TO THE NEXT CHANNEL IF THE TRANSMITTED SEQUENCE NUMBER AGREES WITH THE ACKNOWLEDGED SEQUENCE NUMBER OF THE CHANNEL i.
  ST56 : IF THE NUMBER OF TIMES OF RETRANSMISSIONS OF THE CHANNEL REACHES THE PREDETERMINED NUMBER, SET THE TIME OUT, SEND EXCEPTIONAL NOTIFICATION TO THE APPLICATION, AND PROCEED TO THE NEXT CHANNEL.
  ST57 : PREPARE THE FINALLY TRANSMITTED MESSAGE FOR RETRANSMISSION.
  ST58 : PICK UP THE NEXT PACKET FROM THE RETRANSMITTED MESSAGE.
  ST59 : PROCEED TO THE NEXT CHANNEL IF THE SUM OF THE l_send AND THE NUMBER OF BYTES OF THE PACKET EXCEEDS THE L_send.
  ST60 : PROCEED TO THE NEXT CHANNEL IF THE SUM OF THE l_[h]recv, AND THE NUMBER OF BYTES OF THE PACKET EXCEEDS THE L_[h]recv, WHERE h IS THE FAR END OF THE CHANNEL i.
  ST61 : PROCEED TO THE NEXT CHANNEL IF THE p_[h]recv PLUS ONE EXCEEDS THE P_[h]recv.
  ST62 : TRANSMIT THE PACKET.
  ST63 : ADD THE NUMBER OF BYTES OF THE PACKET TO THE l_send AND l_[h]recv, RESPECTIVELY. ADD ONE TO THE p_send AND p_[h]recv, RESPECTIVELY.
  ST64 : IF THE PACKET IS THE FINAL PACKET OF THE MESSAGE, THEN SET THE FLAG OF THE CHANNEL TO "IDLE".
  ST65 : IF THE p_send REACHES THE P_send, OR THE DIFFERENCE OBTAINED BY SUBTRACTING THE l_send FROM THE L_send IS SMALLER THAN THE L_packet, min, THEN GO TO ST30.
ST30 : END.

FIG.10

( ALGORITHM OF RECEPTION TASK DURING ACKNOWLEDGE-RETRANSMISSION )

ST31 : AWAIT PACKET ARRIVAL FROM THE NETWORK. MAKE THE IDENTIFIER OF AN INCOMING CHANNEL "i".
ST32 : IF THERE IS A PACKET THAT HAS ALREADY HELD IN THE TEMPORARY BUFFER OF THE CHANNEL i, THEN GO TO STEP ST35.
ST33 : IF THE PACKET NUMBER OF A RECEIVED PACKET IS NOT ZERO, THEN GO BACK TO STEP ST31 AFTER DISCARDING THE PACKET.
ST34 : STORE THE RECEIVED PACKET INTO THE TEMPORARY BUFFER AND GO TO STEP ST38.
ST35 : IF THE MESSAGE NUMBER OF THE RECEIVED PACKET DISAGREES WITH THAT OF THE PACKET IN THE TEMPORARY BUFFER, THEN GO BACK TO STEP ST31 AFTER DISCARDING THE RECEIVED PACKET AND THE PACKETS IN THE TEMPORARY BUFFER.
ST36 : IF THE PACKET NUMBER OF THE RECEIVED PACKET DIFFERS FROM A VALUE OBTAINED BY ADDING ONE TO THE PACKET NUMBER OF THE LATEST PACKET IN THE TEMPORARY BUFFER, THEN GO BACK TO STEP ST31 AFTER DISCARDING THE RECEIVED PACKET AND THE PACKETS IN THE TEMPORARY BUFFER.
ST37 : STORE THE RECEIVED PACKET INTO THE TEMPORARY BUFFER AND GO TO STEP ST38.
ST38 : IF THE RECEIVED PACKET IS NOT THE FINAL PACKET OF THE MESSAGE, GO BACK TO STEP ST31.
ST39 : ASSEMBLE THE PACKETS IN THE TEMPORARY BUFFER INTO THE MESSAGE.
ST71 : <u>PLACE IN THE ACKNOWLEDGE TRANSMISSION QUEUE THE ACKNOWLEDGE PACKET FOR CHANNEL i.</u>
ST40 : PLACE THE MESSAGE INTO THE RECEPTION QUEUE OF THE CHANNEL i. IF THE RECEPTION QUEUE IS FULL, DISCARD THE OLDEST ( OR LATEST ) MESSAGE. IF THERE ARE ANY BLOCKED APPLICATION PROGRAMS WHICH ARE CALLED BY THE FUNCTION_recv ( ) AND ASSOCIATED WITH THE CHANNEL i, THEN RELEASE ONE OF THEM.
ST41 : GO TO STEP ST31.

(PACKETIZING MECHANISM FOR CIRCUMVENTING EXTRA COPY)

DATA COMMUNICATION SYSTEM FOR AND METHOD OF AVOIDING COMPUTER NETWORK TRANSMISSIONS OF EXCESSIVE LENGTH

BACKGROUND OF THE INVENTION

1. Field of the Invention

The present invention relates to a data communication system and a data communication method for controlling data communications between computers interconnected through a network.

2. Description of Related Art

FIG. 12 is a block diagram showing a conventional data communication system, in which the reference numeral 1 designates a network structured using Ethernet or FastEthernet; 2 and 3 each designate an operator station (OPS) that exchange message communications or the like with a host computer 4 and controllers 5 and 6; 4 designates the host computer that exchanges message communications or the like with the operator stations 2 and 3 or controllers 5 and 6; and 5 and 6 each designate the controller that exchange message communications or the like with the operator stations 2 and 3 or the host computer 4.

Next, the operation of the conventional data communication system will be described.

Although the host computer 4, operator stations 2 and 3 and the like interconnected through the network 1 exchange message communications with each other, if a message collision occurs on the network 1, problems arise in that the messages are delayed or suffer a loss.

To avoid the collision on the network 1, the conventional system employs a token passing method which allows the host computer 4 and the like to transmit only when they acquire the token.

Besides the foregoing conventional system, Japanese patent application laid-open No. 8-180006/1996 discloses a technique that allots, to computers interconnected through a network, transmission time slots that enable message transmission, thereby preventing a plurality of computers from sending messages to the network in the same time slot. However, if the computer that manages the transmission time slots halts owing to a failure, it becomes impossible for other computers to send messages.

With the foregoing configurations, the conventional data communication systems have a problem in that although they can avoid the message collision on the network 1, if the host computer 4 that acquires the token suffers a breakdown or loses the token, it becomes impossible for the operator system 2 or the like connected to the network 1 to continue subsequent message transmission.

Incidentally, it will be possible to restart the transmission of messages by adding a complicated mechanism for detecting the loss of the token to retransmit the messages, in which case a problem still remains in that the operator system 2 or the like cannot transmit the messages until the new token is issued.

SUMMARY OF THE INVENTION

The present invention is implemented to solve the foregoing problems. It is therefore an object of the present invention to provide a data communication system and a data communication method capable of reducing the delay or loss rate of messages involved in message collisions, and enabling the other computers to transmit even if some computer suffers a failure.

According to a first aspect of the present invention, there is provided a data communication system including an internal computer connected with one or more external computers through a network, the data communication system comprising: memory means for storing a first information amount that each of the external computers can receive in a communication cycle; storing means for storing a second information amount that is transmitted to each of the external computers in the communication cycle; addition means for adding, when transmitted data to one of the external computers is placed in a transmission queue, an information amount of the transmitted data to the second information amount which is stored in the storing means and is associated with the one of the external computers; and transmission means for transmitting the transmitted data to the one of the external computers only if the addition result of the addition means does not exceed the first information amount that the one of the external computers can receive. This offers an advantage of being able to reduce the delay or loss rate of a message, and to enable other computers to transmit messages even if some computer suffers a failure.

Here, the memory means may store a third information amount that the internal computer can transmit in the communication cycle; the storing means may store a fourth information amount that the internal computer transmits in the communication cycle; and the addition means may add, when transmitted data is placed in a transmission queue, an information amount of the transmitted data to the fourth information amount stored in the storing means, and wherein the data communication system may further comprise:

inhibiting means for inhibiting transmission of the transmitted data to the external computers if the addition result of the addition means exceeds the third information amount. This offers an advantage of being able to prevent transmitted data that exceeds the transmission capability of the operating system of the transmitting end from being requested, thereby enabling the computer of the transmitting end to smoothly carry out processings other than the transmission processing.

The memory means may store a maximum receivable information amount that each of the external computers assigns to the internal computer. This offers an advantage of being able to prevent the internal computer from transmitting data that exceeds the receiving capability of the external computer even when the external computer receives data from other external computers.

The first information amount and the second information amount may be each represented in terms of a number of data.

The first information amount, the second information amount, the third information amount and the fourth information amount may be each represented in terms of a number of data.

The first information amount and the second information amount may be each represented in terms of a number of packets.

The first information amount, the second information amount, the third information amount and the fourth information amount may be each represented in terms of a number of packets.

The transmission means may retransmit, if an acknowledge signal is not sent back over a predetermined time period from one of the external computers to which the transmission means transmits transmitted data, the transmitted data to the one of the external computers.

The transmission means may halt its retransmission of the transmitted data if a number of times of the retransmissions reaches a predetermined upper limit.

The data communication system may further comprise saving means for saving, when the transmitted data is divided into packets and a header of each of the packets is overwritten on a part of the transmitted data, the part of the transmitted data into a save area, and for restoring the part of the transmitted data to its original area after transmitting a current packet including the header which is overwritten on the original area.

According to a second aspect of the present invention, there is provided a data communication method of a system including an internal computer connected with one or more external computers through a network, the data communication method comprising the steps of: storing a first information amount that each of the external computers can receive in a communication cycle; storing a second information amount that is transmitted to each of the external computers in the communication cycle; adding, when transmitted data to one of the external computers is placed in a transmission queue, an information amount of the transmitted data to the second information amount which is associated with the one of the external computers; and transmitting the transmitted data to the one of the external computers only if the addition result does not exceed the first information amount that the one of the external computers can receive.

Here, the data communication method may further comprise the steps of: storing a third information amount that the internal computer can transmit in the communication cycle; storing a fourth information amount that the internal computer transmits in the communication cycle; and adding, when transmitted data is placed in a transmission queue, an information amount of the transmitted data to the fourth information amount; and inhibiting transmission of the transmitted data to the external computers if the addition result exceeds the third information amount.

The first information amount and the second information amount may be each represented in terms of a number of data.

The first information amount, the second information amount, the third information amount and the fourth information amount may be each represented in terms of a number of data.

The first information amount and the second information amount may be each represented in terms of a number of packets.

The first information amount, the second information amount, the third information amount and the fourth information amount may be each represented in terms of a number of packets.

BRIEF DESCRIPTION OF THE DRAWINGS

FIG. 2 is a sequence table illustrating an algorithm of a transmission task;

FIG. 3 is a sequence table illustrating an algorithm of a reception task;

FIG. 4 is a diagram showing a transmission reception capability table;

FIG. 5 is a diagram showing a host management table;

FIG. 6 is a diagram showing a channel management table;

FIG. 7 is a list showing library functions;

FIG. 9 is a sequence table illustrating an algorithm of the transmission task;

FIG. 10 is a sequence table illustrating an algorithm of the reception task;

DETAILED DESCRIPTION OF THE PREFERRED EMBODIMENTS

The invention will now be described with reference to the accompanying drawings.

Embodiment 1

Figure 1:
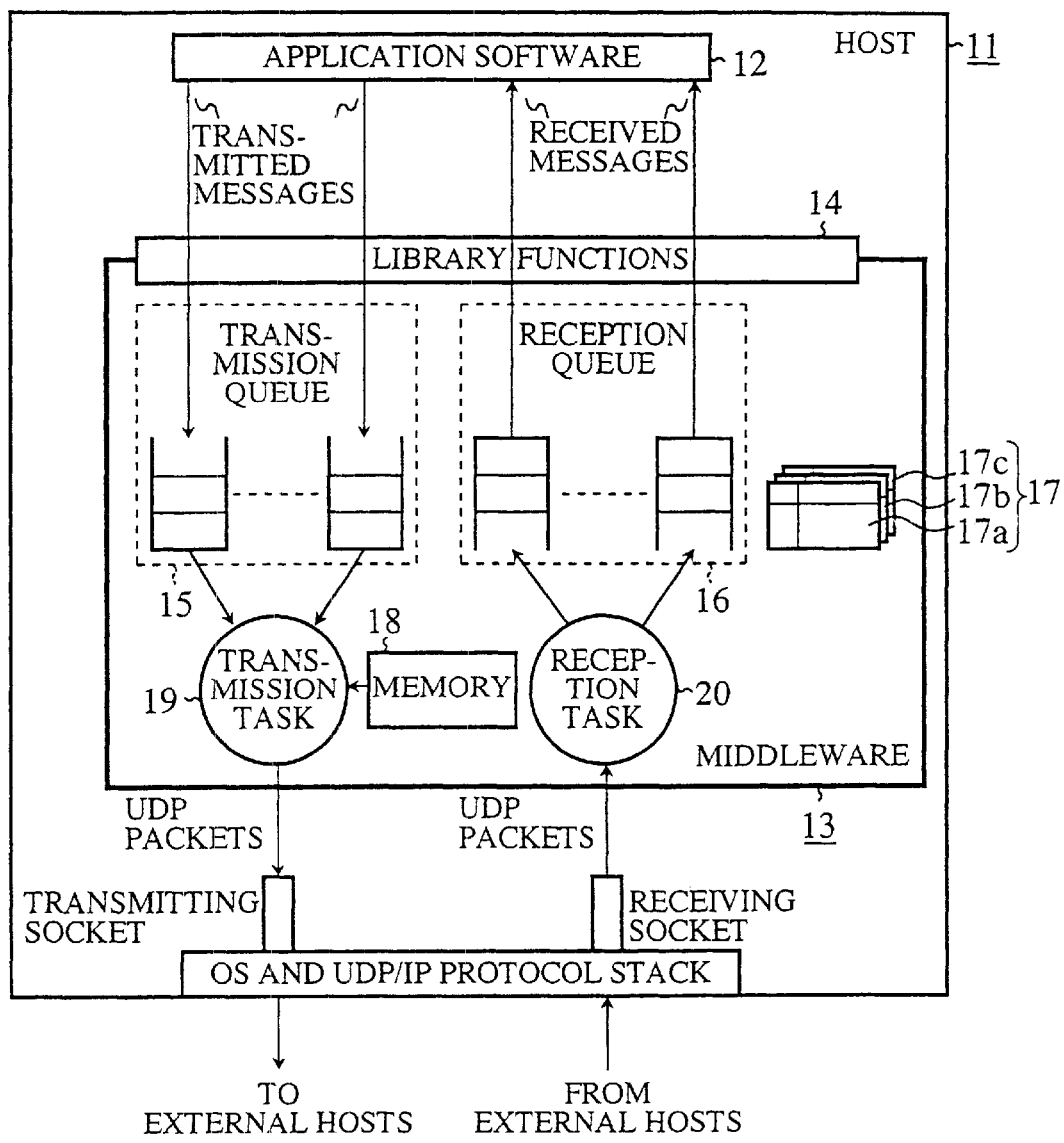
FIG. 1 is a block diagram showing an embodiment 1 of a data communication system in accordance with the present invention.

FIG. 1 is a block diagram showing an embodiment 1 of a data communication system in accordance with the present invention. In FIG. 1, the reference numeral 11 designates a host (computer) that is configured using Ethernet or FastEthernet and is connected to a network; and 12 designates application software that places, when transmitting a message to an external host through the network, the transmitted message (transmission data) in a transmission queue 15 in middleware 13 using library functions 14, and retrieves, when receiving a message from an external host, the received message (received data) from a reception queue 16 in the middleware 13 using the library functions 14.

The reference numeral 13 designates the middleware that transmits transmitted messages through a channel (a one-way channel interconnecting hosts in one to one correspondence), and receives received messages through a channel at the same time; 15 designates the transmission queue in which the transmitted messages are placed; 16 designates the reception queue in which the received messages are placed; 17 designates a table (memory means) for storing the number of bytes (number of data) or the number of packets the present host can transmit in a communication cycle, and for storing the number of bytes (number of data) or the number of packets each external host can receive in the communication cycle; 18 designates a memory (storing means) for storing the number of bytes (number of data) or the number of packets of the data the present host actually transmits in the communication cycle, and for storing the number of bytes (number of data) or the number of packets of the data actually transmitted to each external host h in the communication cycle; 19 designates a transmission task (addition means, transmission means and inhibiting means) for transmitting the transmitted messages considering the transmission capability of the present host or the reception capability of external hosts; and 20 designates a reception task for receiving the received messages.

Next, the operation of the present embodiment 1 will be described with reference to sequence tables shown in FIGS. 2 and 3, which illustrate the algorithm of the transmission task and reception task, respectively.

When the host 11 transmits a message to an external host, the transmission task 19 in the middleware 13 transmits UDP (user datagram protocol) packet (transmitted message) considering the transmission capability of the present host 11 or the reception capability of the external (destination) host. In this case, the host 11 acquires necessary information from a transmission reception capability table 17a, a host management table 17b and a channel management table 17c in the table 17, which will now be described briefly before entering the description of the operation.

Transmission reception capability table 17a (see, FIG. 4).

The transmission reception capability table 17a stores parameters about the communication cycle of the transmission task and parameters about the transmission reception capability of the hosts. The description of the parameters is as follows.

1. T_tick

It indicates the communication cycle of the transmission task. For example, a value such as 10 milliseconds is stored.

2. L_recv

A maximum number of bytes that the present host can receive in the communication cycle.

3. P_recv

A maximum number of packets that the present host can receive in the communication cycle.

4. L_send

A maximum number of bytes that the present host can transmit in the communication cycle.

5. P_send

A maximum number of packets that the present host can transmit in the communication cycle.

6. L_[h]recv

A maximum number of bytes that each host [h] other than the present host can receive in the communication cycle, which is allocated to the present host by the host [h].

7. P_[h]recv

A maximum number of packets that each host [h] other than the present host can receive in the communication cycle, which is allocated to the present host by the host [h].

Host Management Table 17b (see, FIG. 5).

The host management table 17b stores identifiers h that are used by the present host for identifying the external hosts, and IP (Internet Protocol) addresses corresponding to the identifiers h.

Channel Management Table 17c (see, FIG. 6).

Channel Chi, where i (=0, 1, 2, ..., N) is an identifier for identifying the channel, is a one-way communication path for establishing one to one connection between the hosts, and the channel management table 17c stores parameters or the like about the channels. The description of the parameters is as follows.

1. Cycle T [i]

It indicates a communication cycle or minimum transmission interval of a message.

2. Message Length M[i]

It indicates a maximum transmittable message length.

3. Direction (transmit/receive)

It indicates the communication direction of a channel seen from the present host.

4. Destination Host Identifier

It is an identifier of the destination host.

5. Flag (idle/transmit/acknowledge-retransmit)

It is a parameter for checking the communication state of the channel.

6. Transmitted Seq#

The sequence number of the last message in the messages that have already been transmitted.

7. Acknowledged Seq#

The sequence number of the last message in the messages that have been acknowledged of their arrival.

Next, the operation will be described in more detail after a brief description of the function_send( ) of the library functions 14, which the application software 12 uses when transmitting the transmitted message to an external host.

The contents of the function_send( ) are shown in FIG. 7. It is a function for placing the transmitted message in the transmission queue 15 (FIFO queue) prepared for each channel.

Here, the channel identifier Chi of the channel to be used is substituted into the argument ch_id, and one of literal constants BLOCK and NONBLOCK is substituted into the argument flags (In the case where the literal constant BLOCK is substituted, if the transmission cannot be achieved because of the overflow of the queue or the like when the function is called, the function call is blocked (is not returned) until the transmission is enabled, and is returned after completing the transmission. On the other hand, in the case where the literal constant NONBLOCK is substituted, if the transmission is disabled when the function is called, an error is returned).

Furthermore, a pointer to a sbuf_t structure is substituted into the argument sbuf, the number of bytes of a transmitted message is substituted into the member "size", and a pointer to an area that stores the transmitted message is substituted into the member "data".

When the transmitted message is placed in the transmission queue 15 in this way, the transmission task 19 transmits the message placed in the transmission queue 15 to the destination host. Being activated at every T_tick interval, the transmission task 19 substitutes zeros into the temporary variables l_send, p_send, l_[h] recv and p_[h]recv to initial them (step ST1).

Referring to the channel management table 17c after initializing the temporary variables, the transmission task 19 surveys channels with their communication direction is "transmit" seen from the present host, and checks whether the transmission channels reach a transmission time. If any one of them reaches the transmission time, the transmission task 19 changes the flag of that channel from "idle" to "transmit" (steps ST2–ST4).

The transmission time of the channels can be obtained from the time the host is activated, T_tick and the number of times of activations until now.

Changing the flag from "idle" to "transmit", the transmission task 19 decides whether there is any untransmitted packet (a packet that is not yet transmitted among the packets constituting the transmitted message) in the transmission queue 15 of the channel Chi associated with the flag (steps ST10–ST13).

If no untransmitted packet is present, the transmission task 19 searches the transmission queue 15 for the next channel because it is not necessary to carry out the transmission processing of the current channel. If any untransmitted packet is present, on the other hand, the transmission task 19 acquires from the stored value of the temporary variable l_send the sum total of the bytes that are transmitted by the present host in the current communication cycle.

Furthermore, the transmission task 19 acquires from the stored value of the temporary variable l_[h] recv the sum total of the bytes that are transmitted to each external host h in the communication cycle, and acquires from the stored value of the temporary variable p_[h] recv the sum total of the packets that are transmitted to each external host h in the communication cycle.

Acquiring the stored values of the temporary variables l_send and the like, and obtaining the total byte number the present host has transmitted in the communication cycle, the transmission task 19 adds to the total byte number the number of bytes of the untransmitted packet, and decides whether the present host is capable of transmitting the untransmitted packet by comparing the addition result with the L_send (the maximum number of bytes transmittable by the present host in the communication cycle) at step ST14.

If the addition result exceeds the L_send, the transmission task 19 decides that the present host cannot transmit the untransmitted packet because the addition result exceeds the transmittable byte number in the communication cycle.

Likewise, the transmission task 19 adds the number of bytes of the untransmitted packet to the total number of the bytes that have already been transmitted to the destination host h in the communication cycle, and decides whether the destination host is capable of receiving the untransmitted packet by comparing the addition result with the L_[h]recv (the maximum number of bytes receivable by the destination host h in the communication cycle, which is allotted to the present host by the destination host) at step ST15.

If the addition result exceeds the L_[h]recv, the transmission task 19 decides that the destination host h cannot receive the untransmitted packet because the addition result exceeds the receivable byte number of the destination host h in the communication cycle.

Then, the transmission task 19 adds one to the total number of packets transmitted to the destination host h in the communication cycle (when a plurality of packets are transmitted simultaneously, the number of the packets are added instead of one), and decides whether the destination host is capable of receiving the untransmitted packet by comparing the addition result with P_[h]recv (the maximum number of packets the destination host h can receive in the communication cycle, which is allotted to the present host by the destination host h) at step ST16.

If the addition result exceeds the P [h]recv, the transmission task 19 decides that the destination host h cannot receive the untransmitted packet because the addition result exceeds the receivable byte number of the destination host h in the communication cycle.

Afterward, the transmission task 19 transmits the untransmitted packet to the destination host h at step ST17 only if the addition results are below the L_send, L_[h]recv and P_[h]recv, respectively.

After transmitting the untransmitted packet to the destination host h, the transmission task 19 updates the temporary variables by adding to the l_send and l_[h]recv the byte number of the transmitted packet, and by adding one to the p_send and p_[h]recv (step ST18).

If the transmitted packet is the final packet of the transmitted message, the transmission of the transmitted message is completed. Thus, the transmission task 19 changes the flag of the channel Chi from "transmit" to "idle", and removes the transmitted message from the transmission queue 15 at step ST19.

If there are any application programs that are blocked from the call of the function_send( ) associated with the channel Chi, one of the application programs is released so that its transmitted message is placed in the transmission queue 15.

After completing the transmission of all the channels, the transmission task 19 terminates the transmission processing. On the other hand, if the present host is incapable of transmitting a packet of a minimum packet length L_packet, min, the transmission task 19 compares the temporary variable p_send with the P_send (the maximum packet number the present host can transmit in the communication cycle).

If the temporary variable p_send reaches the P_send, the transmission task 19 decides that the present host is incapable of transmitting, and completes its processing at step ST20.

Alternatively, the transmission task 19 can completes its processing if the value obtained by subtracting the temporary variable l_send from the L_send is less than L_packet,min.

Next, the operation will be described of receiving UDP packets (received message) transmitted from an external host.

A message transmitted from an external host is received by the reception task 20. The reception task 20, which is activated at step ST31 when a packet arrives from the network, checks the matching of the sequence number of the message and the packet number (order of packets within the message).

Here, the sequence number of the message and the packet number are added to each packet, and the packet number is increased one by one beginning from "0" assigned to the initial packet of the message.

More specifically, the reception task 20 makes a decision that the received packet is the initial packet of the message if a temporary buffer (not shown) does not store any packet. Thus, if the packet received in this situation has a packet number other than "0", the reception task 20 decides that a packet in the message is lost, discards the received packet and awaits the next packet (steps ST32 and ST33).

On the other hand, if the packet number of the received packet is "0", the reception task 20 stores the received packet in the temporary buffer at step ST34.

Here, it is necessary that the sequence number in the received packet equals the sequence number in the packets stored in the temporary buffer, and the packet number of the received packet equals one plus the packet number of the latest packet stored in the temporary packet. Accordingly, unless these conditions are satisfied, the reception task 20, considering that a packet loss takes place in the message, discards the packets in the temporary buffer, and awaits the arrival of the next packet (steps ST35 and ST36).

In contrast, if these conditions are met, the reception task 20 stores the received packet in the temporary buffer at step ST37.

Thus, the reception task 20 repeats the foregoing processing until the final packet of the message is received (step ST38). When the final packet is stored in the temporary buffer, the reception task 20 assembles the original message from all the packets stored in the temporary buffer at step ST39, and discards the packets in the temporary buffer at step ST40 after placing the message in the reception queue 16 (FIFO queue).

If the reception queue 16 is full, the oldest or latest message is removed from the queue in a prescribed procedure.

If there are any application programs that are blocked from the call of the function_recv( ) associated with the current channel, one of the application programs is released so that it acquires a received message from the reception queue 16.

After completing the foregoing processing, the reception task 20 awaits the arrival of the next packet at step ST41.

Once the received message has been placed in the reception queue 16, the application software uses the function_recv( ) in the library functions 14. Thus, the function_recv( ) will be described briefly.

The contents of the function_recv( ) is shown in FIG. 7. It is a function for reading the received message from the reception queue 16 prepared for each channel.

Here, the channel identifier Chi of the channel to be used is substituted into the argument ch_id, a pointer to an area for storing the read received message is substituted into the argument buf, and a maximum length of a read message is substituted into the argument limit_size. If the length of the received message in the reception queue 16 is longer than the limit_size, initial limit_size bytes of the message are stored.

The size of the read received message is substituted into the argument "size". If the length of the received message is longer than the limit_size, the value of the length is stored. One of the literal constants BLOCK and NONBLOCK is substituted into the argument flags (in the case where the literal constant BLOCK is substituted, if no received message is present in the reception queue 16, the function call is blocked until a message arrives at the channel. On the other hand, in the case where the literal constant NON-BLOCK is substituted, if no received message is present in the reception queue 16, an error is returned).

Although the division of the transmitted message is not described in the present embodiment 1, the transmission task 19 can divide the transmitted message as needed, and outputs the divisions to the network as the UDP packets.

Each packet includes the sbuf_t structure as shown in FIG. 7 as its header, and retains, following the header, a part of the contents (data portion) of the original message.

In the sbuf_t structure, the member ch_id_at_sender denotes the channel identifier at the transmitting end; the member ch_id_at_receiver denotes the channel identifier at the receiving end; the member addr_sender denotes the IP address at the transmitting end; the member msg_seq_num denotes the sequence number of the message; the member packet_id denotes the packet number in the message; and the member "size" denotes the length (number of bytes) of the data portion in the packet.

No byte is assigned to the member "data", and the header does not include the member "data".

As described above, the present embodiment 1 is configured such that when transmitting a message to a destination host, the transmission task 19 in the middleware 13 considers the transmission capability of the present host and the receiving capability of the destination host before transmitting the message. This offers advantages of being able to reduce not only the delay of the message due to collision of the messages, but also the loss ratio of the message, thereby enabling the host to transmit a message even if some other host suffers a failure.

In the present embodiment 1, messages are transmitted asynchronously between the hosts without establishing synchronization between them. Thus, a failure of a particular host has no effect on the external hosts, thereby enabling them to transmit the messages free from the failure. It is known that assurance of the maximum byte number and maximum packet number transmitted in a fixed time (10 msec, for example) from the hosts assures the network load of less than a predetermined amount, which in turn reduces the delay or loss rate of the messages due to the message collision on the Ethernet (see, reference 1)

Reference 1: Steven L. Beyerman and Edward J. Coyle, "The Delay Characteristics of CSMA/CD Networks", IEEE Transaction on Communications, Vol. 36, No. 5, pp. 553–563, May 1998.

Embodiment 2

FIG. 2 is a block diagram showing an embodiment 2 of the data communication system in accordance with the present invention, in which the corresponding portions to those of FIG. 1 are designated by the same reference numerals and the description thereof is omitted here.

Figure 8:
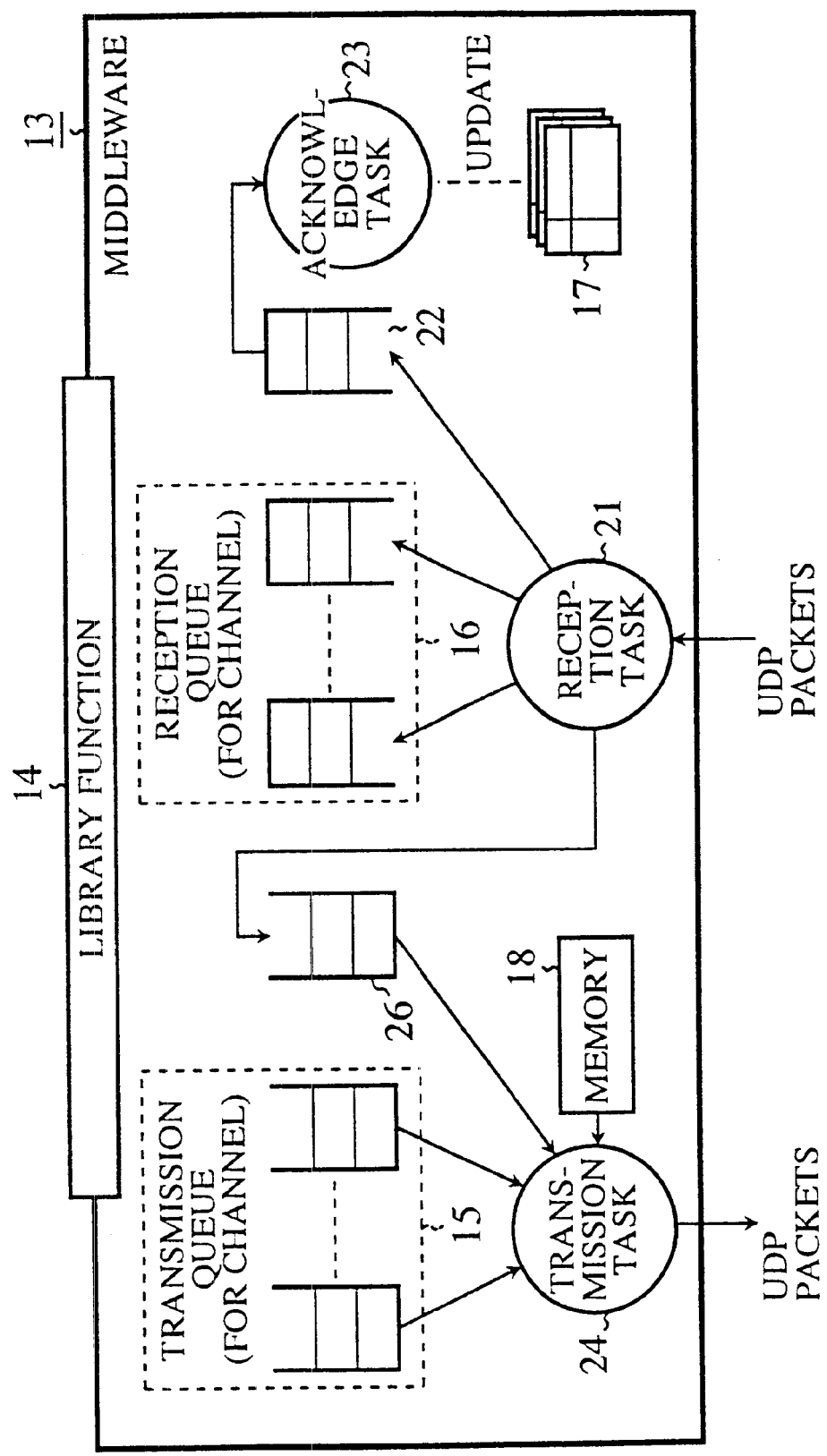
FIG. 8 is a block diagram showing an embodiment 2 of the data communication system in accordance with the present invention.

In FIG. 8, the reference numeral 21 designates a reception task that not only performs the same functions as the reception task 20, but also places into an acknowledge reception queue 22 an acknowledge packet (acknowledge signal), when receiving it from an external host; 22 designates the acknowledge reception queue for storing the acknowledge packet; 23 designates an acknowledge task that acquires the acknowledge packet from the acknowledge reception queue 22, reads-from the acknowledge packet a channel identifier i and a sequence number, and updates an acknowledged sequence number of that channel; 24 designates a transmission task 24 (addition means, transmission means and inhibiting means) that not only has the same functions as the transmission task 19, but also compares, after transmitting a message, a transmitted sequence number in the channel management table 17c with the acknowledged sequence number, and retransmits the message if they do not agree over a predetermined time.

The operation of the present embodiment 2 will now be described with reference to the sequence table of FIGS. 9 and 10. FIG. 9 is a sequence table illustrating algorithm of a transmission task, and FIG. 10 is a sequence table illustrating algorithm of a reception task.

In a plant supervisory control system, for example, even if some messages of supervisory data are lost which are periodically sent from a controller to an operator station, it will little effect on the whole system.

However, if a command message for updating setting values is lost which is sent from the operation station to the controller under instructions of an operator of the plant, it will have a decisive effect on the whole system.

Thus, retransmission of a lost message, and transmission of an acknowledge of a message back to the transmitting side are very important for such a system.

In the foregoing embodiment 1, however, although the transmission task 19 transmits a message, the application software 12 of the transmitting side cannot confirm whether the destination host receives the message or not, and hence cannot retransmit the message.

In view of this, the present embodiment 2 adds the acknowledge reception queue 22 and acknowledge task 23. Specifically, receiving a transmitted message, the destination host transmits to the originating host an acknowledge packet indicating that it receives the transmitted message.

The acknowledge packet includes the channel identifier i and the sequence number of the current message.

When the acknowledge packet is sent back to the transmitting host in this way, the reception task 21 receives it, and places it in the acknowledge reception queue 22 at step ST71.

Placing the acknowledge packet into the acknowledge reception queue 22 will activate the acknowledge task 23 which acquires the acknowledge packet from the acknowledge reception queue 22, and reads from the acknowledge packet the channel identifier i and the sequence number of the transmitted message.

Identifying the channel associated with the transmitted message from the channel identifier i, the acknowledge task 23 updates the acknowledged sequence number of that channel to the sequence number of the transmitted message.

On the other hand, the transmission task 24 compares, after transmitting the message, the transmitted sequence number in the channel management table 17c with the acknowledged sequence number, and if the two sequence numbers agree (when the acknowledge task 23 updates the acknowledged sequence number to the sequence number of the transmitted message), the transmission task 24 makes a decision that the transmitted message arrives at the receiving host without fail. Unless the two sequence numbers agree over the predetermined time period, the transmission task 24 retransmits the transmitted message.

If the number of times of the retransmissions reaches a predetermined number (upper limit), the transmission task 24 stops the retransmission of the transmitted message, and notifies the application software 12 of that fact.

More specifically, if the transmission task 24 makes a decision at step ST4 that a transmission time has not yet come, it makes a decision at step ST51 whether an acknowledge-retransmission time has come or not, and if the time comes, it changes the flag of the channel to "acknowledge-retransmit".

The acknowledge-retransmission time for a transmitted message of the channel is determined as follows with respect to the transmission time t_start.

$$t\_start+T\_ack,\ t\_start+2T\_ack,\ \ldots,\ t\_start+N\_ack \cdot T\_ack$$

where N_ack is the predetermined number of times of the acknowledge-retransmissions for the channel, T_ack is a maximum multiple of the T_tick that does not exceed (T/N_ack), and T is the cycle of the channel. If the positive T_ack that meets these conditions is not present, a decision is made that the acknowledge-retransmission of the channel is impossible.

Subsequently, the transmission task 24 performs the following processings on the channel whose direction is "transmit" and whose flag is indicative of "acknowledge-retransmit".

If the transmission task 24 has begun the retransmission of a message, and has already transmitted a few packets, it carries out the subsequent packet transmission processing (steps ST54 and ST58).

On the other hand, if the transmission task 24 has not yet started the retransmission of a message, it checks whether an unacknowledged message is present or not by comparing the transmitted sequence number with the acknowledged sequence number of the current channel at step ST55.

If the two sequence numbers agree, the transmission task 24 completes the processing of the channel. In contrast, if they disagree, the transmission task 24 checks whether the number of times of the acknowledge-retransmissions of the transmitted message reaches the predetermined number N_ack of the acknowledge-retransmissions of the channel, and if it reaches the N_ack, it makes a decision that the time out of the transmission takes place, and sends to the application software 12 an exceptional notification at step ST56. Unless it reaches the N_ack, the transmission task 24 prepares for the retransmission the message that was sent most recently (step ST57).

From step ST58 onward, the transmission task 24 picks up a packet from the retransmitted message, and transmits it. Through steps ST59–ST65, the transmission task 24 makes a decision as to whether the transmission of the packet causes an overload on the transmission capability of the present host or on the reception capability of the receiving end, and only if it decides that the transmission does not cause the overload, it transmits a packet, and updates the temporary variables. When transmitting the packet, the transmission task 24 decides whether another packet with the minimum length is transmittable within the current cycle, and if impossible, it completes its processing.

Embodiment 3

In the foregoing embodiments 1 and 2, the transmitting end divides a message into several data portions, and forms packets by adding to the beginning of each data portion a header with the sbuf_t structure as shown in FIG. 7. Since the original data is stored in a continuous area on the main memory, one of the following steps must be taken to generate the second and following packets.

(1) Overwrite the header on the data portion of the preceding packet.

(2) Copy the data portion on another area, and adds the header to the copied data portion.

The original data is required in a case of the retransmission of the message, which becomes necessary if an unacknowledged state occurs after the transmission of the message as in the foregoing embodiment 2. The method (1), however, cannot be used without change because the original data is lost by overwriting the header. On the other hand, the method (2) will increase the CPU load of the host because it takes a not negligible time to copy the entire data portions of the message on the main memory.

Figure 11:
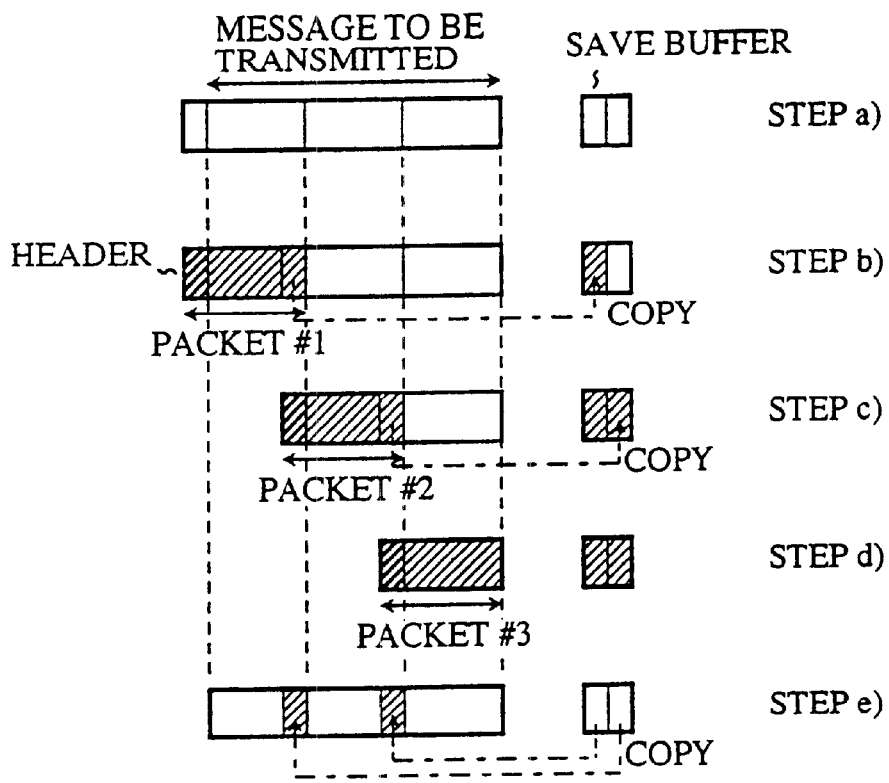
FIG. 11 is a diagram illustrating a packetizing mechanism at a transmitting end.
Figure 12:
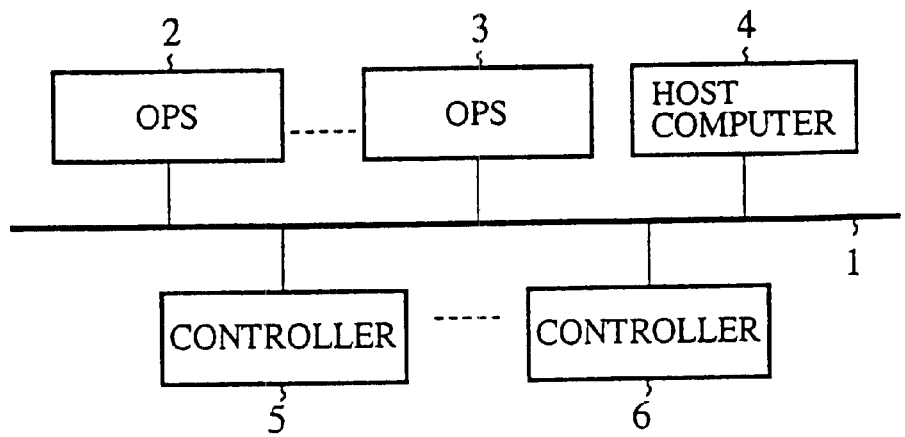
FIG. 12 is a block diagram showing a conventional data communication system.

In view of this, the present embodiment 3 takes steps as illustrated in FIG. 11. It copies, before overwriting the header of each of the second and following packets on the data portion of the previous packet, the data portion on which the overwriting is made to a save buffer, and copies the content of the save buffer back to the original area after transmitting the packet, thereby leaving the original message, and preventing the entire message from being copied on the main memory.

Since the length of the header is much shorter than the length of the data portion, the CPU time required for copying the corresponding portion to the save buffer and copying back to the original area will be much shorter than the CPU time taken to copy the entire data portions.

FIG. 11 is a diagram illustrating the packetizing mechanism at the transmitting end. At step a), the application software 12, which calls the library function_send( ), provides a transmitted message.

Since the data portions of the message are provided in the form of the member "data" with the sbuf_t structure, the area with the sbuf_t structure for storing the header of the first packet is provided in advance by the application software 12.

At step b), the first packet #1 is generated and transmitted. Subsequently, the area on which the header of the next packet is overwritten is copied to the save buffer.

At step c), the second packet #2 is generated and transmitted, followed by the copy to the save buffer in the same manner.

At step d), the final packet #3 is transmitted, and at step e), the contents of the save buffer are copied back to the original area.

What is claimed is:

1. A data communication system including an internal computer connected to external computers through a network, said data communication system comprising:

memory means for storing respective first information amounts that each of the external computers can receive in one communication cycle;

storing means for storing a second information amount that has been transmitted to each of the external computers in a single communication cycle;

addition means for adding, when data to be transmitted to a selected one of the external computers is placed in a transmission queue, an information amount of the data to be transmitted in the single communication cycle to the second information amount stored in the storing means and associated with the selected one of the external computers to produce a first sum; and transmission means for transmitting the data to be transmitted to the selected one of the external computers only if the first sum does not exceed the first information amount that the selected one of the external computers can receive in the single communication cycle.

2. The data communication system as claimed in claim 1, wherein said memory means stores a third information amount that the internal computer can transmit in one communication cycle;

said storing means stores a fourth information amount that the internal computer has transmitted in the single communication cycle; and said addition means adds, when the data to be transmitted is placed in the transmission queue, the information amount of the data to be transmitted in the single communication cycle to the fourth information amount to produce a second sum, and said data communication further comprises inhibiting means for inhibiting transmission of the data to be transmitted to the external computer if the second sum exceeds the third information amount.

3. The data communication system as claimed in claim 1, wherein said memory means stores a maximum receivable information amount that each of the external computers assigns to the internal computer.

4. The data communication system as claimed in claim 1, wherein the first information amount and the second information amount are each represented in terms of a number of data.

5. The data communication system as claimed in claim 2, wherein the first information amount, the second information amount, the third information amount, and the fourth information amount are each represented in terms of a number of data.

6. The data communication system as claimed in claim 1, wherein the first information amount and the second information amount are each represented in terms of a number of packets.

7. The data communication system as claimed in claim 2, wherein the first information amount, the second information amount, the third information amount and the fourth information amount are each represented in terms of a number of packets.

8. The data communication system as claimed in claim 1, wherein said transmission means retransmits, if an acknowledge signal is not sent back during a time period from an external computer to which said transmission means has transmitted the transmitted data, the transmitted data to the external computer.

9. The data communication system as claimed in claim 8, wherein said transmission means halts retransmission of the transmitted data if the number of retransmissions reaches an upper limit.

10. The data communication system as claimed in claim 8, further comprising saving means for saving, when the transmitted data is divided into packets and a header of each of the packets is overwritten on a part of the transmitted data, the part of the transmitted data into a save area, and for restoring the part of the transmitted data to an original area after transmitting a current packet including the header overwritten on the original area.

11. A data communication method in a system including an internal computer connected to external computers through a network, said data communication method comprising:

storing respective first information amounts that each of the external computers can receive in one communication cycle;

storing a second information amount that has been transmitted to each of the external computers in a single communication cycle;

adding, when data to be transmitted to a selected one of the external computers is placed in a transmission queue, an information amount of the data to be transmitted in the single communication cycle to the second information amount associated with the selected one of the external computers to produce a first sum; and transmitting the data to be transmitted to the selected one of the external computers only if the first sum does not exceed the first information amount that the selected one of the external computers can receive in the single communication cycle.

12. The data communication method as claimed in claim 11, further comprising:

storing a third information amount that the internal computer can transmit in one communication cycle;

storing a fourth information amount that the internal computer has transmitted in the single communication cycle;

adding, when data to be transmitted is placed in the transmission queue, the information amount of the data to be transmitted in the single communication cycle to the fourth information amount to produce a second sum; and inhibiting transmission of the transmitted data to the external computers if the second sum exceeds the third information amount.

13. The data communication system as claimed in claim 11, wherein the first information amount and the second information amount are each represented in terms of a number of data.

14. The data communication system as claimed in claim 12, wherein the first information amount, the second information amount, the third information amount, and the fourth information amount are each represented in terms of a number of data.

15. The data communication system as claimed in claim 11, wherein the first information amount and the second information amount are each represented in terms of a number of packets.

16. The data communication system as claimed in claim 12, wherein the first information amount, the second information amount, the third information amount, and the fourth information amount are each represented in terms of a number of packets.

* * * * *